United States Patent
Oh

(10) Patent No.: US 11,015,074 B2
(45) Date of Patent: May 25, 2021

(54) MIXED INK MIXED WITH FAR-INFRARED RADIATION MATERIAL, METHOD FOR PREPARING SAME, AND PRINTED MATTER WITH MIXED INK PRINTED THEREON

(71) Applicant: Se Hyun Oh, Gimpo-si (KR)

(72) Inventor: Se Hyun Oh, Gimpo-si (KR)

( * ) Notice: Subject to any disclaimer, the term of this patent is extended or adjusted under 35 U.S.C. 154(b) by 63 days.

(21) Appl. No.: 16/328,725

(22) PCT Filed: Oct. 12, 2017

(86) PCT No.: PCT/KR2017/011257
§ 371 (c)(1),
(2) Date: Feb. 27, 2019

(87) PCT Pub. No.: WO2018/070805
PCT Pub. Date: Apr. 19, 2018

(65) Prior Publication Data
US 2019/0225825 A1  Jul. 25, 2019

(30) Foreign Application Priority Data

Oct. 12, 2016  (KR) .................. 10-2016-0132068
Oct. 12, 2017  (KR) .................. 10-2017-0132359

(51) Int. Cl.
*C09D 11/38*  (2014.01)
*B42D 15/00*  (2006.01)
*C09D 11/02*  (2014.01)

(52) U.S. Cl.
CPC .............. *C09D 11/38* (2013.01); *B42D 15/00* (2013.01); *C09D 11/02* (2013.01)

(58) Field of Classification Search
None
See application file for complete search history.

(56) References Cited

U.S. PATENT DOCUMENTS

| 4,886,972 A | * | 12/1989 | Nakai | C09K 9/00 |
| | | | | 250/504 R |
| 9,962,441 B2 | * | 5/2018 | Vissman | A61K 41/0052 |
| 2003/0177950 A1 | * | 9/2003 | Schoen | C09D 5/032 |
| | | | | 106/415 |

(Continued)

FOREIGN PATENT DOCUMENTS

| CN | 101591489 A | * | 12/2009 |
| JP | 3130775 | | 1/2001 |

(Continued)

OTHER PUBLICATIONS

English translation of the International Search Report dated Mar. 2, 2018 for PCT/KR2017/011257; 2 pages.*

(Continued)

*Primary Examiner* — Helene Klemanski
(74) *Attorney, Agent, or Firm* — Antonio Ha & U.S. Patent, LLC

(57) ABSTRACT

The present invention relates to a mixed ink mixed with a far-infrared-emitting material, a method for preparing the mixed ink, and a printed matter on which the mixed ink is printed, wherein the mixed ink is a printing ink used in a printing process for a printed matter and the mixed ink is prepared by mixing a pigment mixture with a powder type far-infrared-emitting material. Therefore, a mixed ink, which is to be printed on an object, is mixed with a far-infrared-emitting material to maintain a high far-infrared emissivity of 0.88 or greater, so that 60% or more of various noxious gases, which are generated from the printed matter, can be deodorized to allow a user to use the printed matter without repulsion; about 90% or more of staphylococci and pneumococci can be reduced to maintain cleanliness; and the contamination and pathogen transmission due to the use of the printed matter can be prevented in advance.

4 Claims, 7 Drawing Sheets

(56) References Cited

U.S. PATENT DOCUMENTS

2008/0311059 A1* 12/2008 Lin .................. A61N 5/0616
424/59
2017/0328789 A1* 11/2017 Park .................. C04B 35/14

FOREIGN PATENT DOCUMENTS

| JP | 2003/147249 A | * | 5/2003 |
| JP | 2006/274228 A | * | 10/2006 |
| KR | 10-1996-0011909 | | 9/1996 |
| KR | 10-2004-0094570 | | 11/2001 |
| KR | 10-2003-0067371 | | 8/2003 |
| KR | 10-2004-0077023 | | 9/2004 |
| KR | 2004/0087113 A | * | 10/2004 |

OTHER PUBLICATIONS

English translation of the Written Opinion of the International Search Authority dated Mar. 2, 2018 for PCT/KR2017/011257; 10 pages.*
English translation of Chinese First Office Action dated Jul. 1, 2020 for CN 109641476; 6 pages.*
EPO Search Report for EP Application No. 17859409, dated May 6, 2020; 2 pages.*
EPO Written Opinion for EP Application No. 17859409, dated May 6, 2020; 4 pages.*
English translation of Japanese First Office Action dated Apr. 28, 2020 for JP Application No. 2019/534624; 4 pages.*
English translation of KR 2004/0077023, Sep. 2004; 10 pages.*
English translation of JP 2006/274228, Oct. 2006; 6 pages.*
English translation of KR 2004/0087113, Oct. 2004; 11 pages.*
English translation of JP 09/077620, Mar. 1997; 9 pages.*
English translation of JP 2003/147249, May 2003; 5 pages.*
English translation of CN 101591489, Dec. 2009; 6 pages.*
English Specification of 10-1996-0011909, Sep. 1996.
English Specification of 10-2004-0077023, Sep. 2004.
English Specification of 10-2003-0067371, Aug. 2003.
English Specification of 10-2004-0094570, Nov. 2004.
English Specification of 3130775, Jan. 2001.

* cited by examiner

| date | Test conditions<br>white box: normal box<br>yellow box: box printed with FIR radiant material-containing mixed ink | |
|---|---|---|
| 2017.06.01. |  |  |
| 2017.06.13. |  |  |
| 2017.06.21. |  |  |

MIXED INK MIXED WITH FAR-INFRARED RADIATION MATERIAL, METHOD FOR PREPARING SAME, AND PRINTED MATTER WITH MIXED INK PRINTED THEREON

TECHNICAL FIELD

The present invention relates to a printing ink, a method of manufacturing the same, and matter printed with the ink and, particularly, to a far infrared radiant material-containing mixed ink, a method of manufacturing the same, and matter printed with the mixed ink, in which as the printing ink contains a far infrared radiant material, it may deodorize various harmful gases coming from the printed matter, allowing the user to use the printed matter without reluctance, maximize anti-bacterial functionality to maintain cleanness, and prevent decomposition upon use in food packaging to thereby prolong the period of preservation.

BACKGROUND ART

Typically, printed matter refers to printed materials resulting from applying a printing ink to the surface of a printing plate and printing letters or figures formed in the surface of the plate to, e.g., paper.

The printing ink is produced by mixing pigment with a resin, such as vanish or rosin, which is high adhesive and harmless to human body.

Printed matter using conventional printing ink may leave odors which comes from the ink itself or from contamination while in use, causing the user to feel reluctant. In particular, the contaminated ink may subject the user to exposure to harmful germs.

Meanwhile, far infrared, which is a kind of electromagnetic radiation, may warm up materials and strongly infiltrate into organisms—thus called the ray of life or growth. Far infrared radiation emits thermal energy of a long wavelength ranging from about 3.6 μm to 16 μm. In particular, the thermal energy may reach 40 mm deep under the skin, warming and expanding human capillaries and thus promoting blood circulation. Far infrared rays are known to promote the growth of animals or plants and to be applied to crops in green houses with the result of noticeable effects.

A conventional method of using far infrared is to put a far infrared radiant material in the target. For example, a far infrared radiant material may be added in the process of preparing paper to produce books or in the raw material when making PET bottles.

However, putting the far infrared radiant material in the raw material evenly over the raw material may increase the amount of far infrared radiant material as necessary, resulting in a cost rise. Mixing a far infrared radiant material in the process of manufacturing the target product requires a change or modification to the manufacturing process, thus causing a delay in the manufacturing process or cost rise in the modification.

DETAILED DESCRIPTION OF THE INVENTION

Technical Problem

Therefore, the present invention aims to provide a far infrared radiant material-containing mixed ink, a method of manufacturing the same, and matter printed with the mixed ink, in which, as a mixed ink for printing a target object contains a far infrared radiant material, the mixed ink may maintain a high far infrared emissivity of 0.88 or more, thus able to remove harmful gases coming out of the printed matter by 60% or more and preventing the user from feeling reluctant in using the printed matter, and may reduce *staphylococcus* and pneumonia-causing germs by about 90% or more, preventing contamination and transmission of germs due to use of printed matter while maintaining cleanness.

Further, another object of the present invention is to provide a far infrared radiant material-containing mixed ink, a method of manufacturing the same, and matter printed with the mixed ink, which may block various harmful substances coming from the printed matter itself, present various advantageous effects of far infrared radiations, keep food fresh by storing it in a packing container printed with the mixed ink or placed along with the printed matter, and prevent decomposition to prolong the period of preservation and sell-by dates.

Another object of the present invention is to provide a far infrared radiant material-containing mixed ink, a method of manufacturing the same, and matter printed with the mixed ink, in which the far infrared radiant material-containing mixed ink may present high emissivity by being merely used without including the far infrared radiant material in the target object to which the ink is applied, such as paper or wall paper, thereby significantly saving manufacturing costs and maximizing the effects.

Technical Solution

The foregoing objects are achieved by a mixed ink containing a far infrared radiant material, used for printing and prepared by mixing a pigment blend with a powdered far infrared radiant material, according to an embodiment of the present invention.

The far infrared radiant material may be mixed in 3 weight % to 10 weight % relative to an overall weight of the mixed ink.

The far infrared radiant material may be prepared to have a diameter range from 1 μm to 5 μm.

The pigment blend may include one or more of an ink binder or an ink adjuvant to the pigment.

For example, where the pigment blend is yellow, the pigment blend may be prepared of the pigment of 10 weight % to 13 weight %, the ink binder of 70 weight % to 75 weight %, and the ink adjuvant of 5 weight % to 10 weight %, and unless the pigment blend is yellow, the pigment blend may be prepared of the pigment of 18 weight % to 22 weight %, the ink binder of 65 weight % to 70 weight %, and the ink adjuvant of 5 weight % to 10 weight %.

The far infrared radiant material may be blended with any one or two of an ink binder or ink solvent and be then mixed with the pigment blend.

Meanwhile, the foregoing objects are also achieved by matter printed with the above-described far infrared radiant material-containing mixed ink, in which the far infrared radiant material-containing mixed ink has a far infrared emissivity ranging from 0.87 to 0.93 in a temperature range from 20° C. to 39° C. and a deodorization rate reaching 60% to 80% three hours after printing.

Here, a concentration of *staphylococcus* may be reduced by 90% or more 18 hours after relative to an initial concentration of the *staphylococcus*, and a concentration of pneumonia-causing germs may be reduced by 90% or more 18 hours after relative to an initial concentration of the pneumonia-causing germs.

Further, the mixed ink may be applicable to paper, PET, vinyl, or various fabrics used in a book, wall paper, or food packing material.

Meanwhile, the foregoing objects may also be achieved by a method of manufacturing a mixed ink containing a far infrared radiant material, according to another embodiment of the present invention, the method comprising: preparing a pigment blend by blending an ink binder with a pigment and dispersing the pigment to surround the pigment with the ink binder; preparing a far infrared radiant material blend by crushing the far infrared radiant material to have a preset diameter range, blending the crushed far infrared radiant material with an ink binder and then dispersing the far infrared radiant material; mixing the pigment blend with the far infrared radiant material blend; and performing adjustment by mixing any one or two of an ink adjuvant or an ink solvent with the mixture of the pigment blend and the far infrared radiant material blend.

Here, blending the pigment with the ink binder and blending the far infrared radiant material with the ink binder may further include additionally blending an ink solvent corresponding to dispersion viscosity of the blends.

Advantageous Effects

Therefore, matter printed with a far infrared radiant material-containing mixed ink according to the present invention may maintain a high far infrared emissivity of 0.88 or more, thus able to remove harmful gases coming out of the printed matter by 60% or more and preventing the user from feeling reluctant in using the printed matter. Further, the present invention may reduce *staphylococcus* and pneumonia-causing germs by about 90% or more, preventing contamination and transmission of germs due to use of printed matter while maintaining cleanness.

Further, when studying materials or books are printed with a far infrared radiant material-containing mixed ink according to the present invention, far infrared rays are radiated from the printed matter itself, blocking various harmful substances and presenting various advantageous effects of far infrared radiations.

A food stored in a food packing container printed with a far infrared radiant material-containing mixed ink according to the present invention or placed along with the printed matter may remain clean and fresh and be prevented from decomposition. As such, the present invention may prolong the period of preservation and sell-by date, contributing to the growth and viability of relevant industry.

Further, the far infrared radiant material-containing mixed ink according to the present invention may be applicable to IT, car, home appliance, construction, or other various industrial sectors for which ink or paint may be used, in various manners, such as printing, applying, deposition, or adhesion, maximizing expandability and contributing to the development of the relevant industrial sectors.

Further, the far infrared radiant material-containing mixed ink according to the present invention may present high emissivity by being merely used without including the far infrared to radiant material in the target object to which the ink is applied, such as paper or wall paper, thereby significantly saving manufacturing costs and maximizing the effects.

MODE FOR CARRYING OUT THE INVENTION

Figure 1:
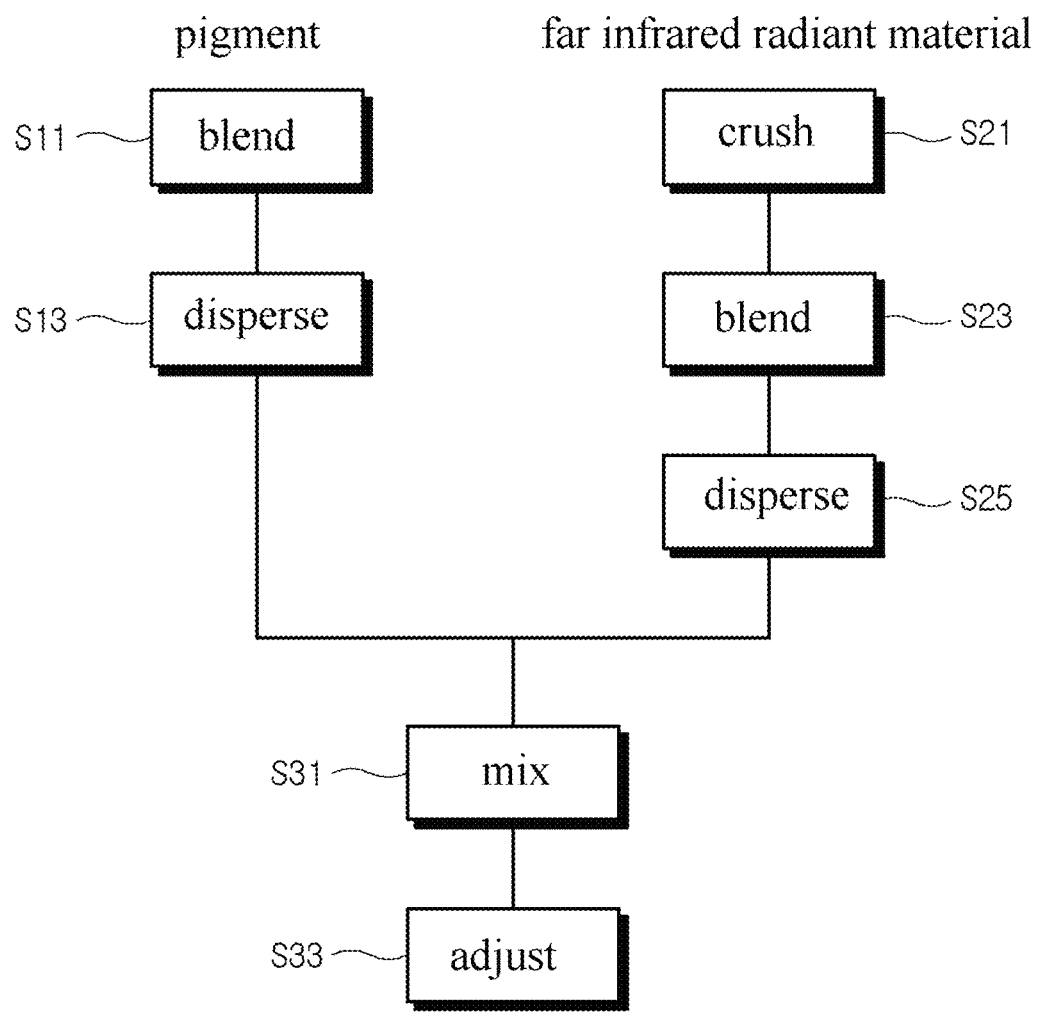
FIG. 1 is a flowchart illustrating a method of manufacturing a mixed ink containing a far infrared radiant material according to an embodiment of the present invention.

Hereinafter, embodiments of the present invention are described in detail with reference to the accompanying drawings.

According to an embodiment of the present invention, a mixed ink containing a far infrared radiant material is an ink used for printing and its gist lies in being manufactured by mixing a powdered far infrared radiant material with a pigment blend.

The matter printed with a mixed ink according to an embodiment of the present invention refers to matter printed with a mixed ink containing the far infrared radiant material.

The printed matter defined according to the present invention is not limited in scope to specific types of printed matter or printing schemes as long as it is produced using a common printing ink conventionally used.

For example, printed matter may be produced in various printing schemes, such as offset printing and may be used, without limitation, in various kinds, such as booklets, learning materials, magazines, fliers, or newspapers.

Without limitation to particular one, a variety of material may be applied to printed matter, such as paper used in books, wallpapers, or food packing materials, as well as synthetic resins, e.g., PET or vinyl, natural resins or fabrics such as of curtains. Further, the present invention may also be applicable to paints used in, e.g., walls, desks, furniture, or vehicles.

Meanwhile, where the printed matter is a book, the present invention may be used for both the cover and the pages regardless of the kind or material of the cover and pages and may be applicable, without limitation, to various processing tasks, such as pre-process or post-process in the printing process.

The far infrared radiant material refers to a material that radiates far infrared rays and, as the far infrared radiant material, various known materials may be used, such as any one, or a combination of two or more of, e.g., kaolinite, germanium, loess, elvan stone, bioceramics, illite, mica, and feldspars. Besides, silica, alumina, iron oxide, or magnesium oxide may also be used as the far infrared radiant material.

Far infrared rays are a kind of electromagnetic radiation and, by their nature of warming up materials and strong infiltration into organisms, are called rays of life or growth and emit thermal energy of a long wavelength ranging from about 3.6 µm to about 16 µm. In particular, the thermal energy may reach 40 mm deep under the skin, warming and expanding human capillaries and thus promoting blood circulation. Far infrared rays are known to promote the growth of animals or plants and to be applied to crops in green houses with the result of noticeable effects.

The far infrared radiant material-containing mixed ink, according to the present invention, may be mixed with various additional materials, e.g., anion-emitting materials, such as tourmaline.

Anions are known for various effects including, e.g., blood purification, tranquilizing, autonomic nerve adjustment, reinforcing immune system, reinforcing pulmonary function, pain killing, and allergy mitigation.

The far infrared radiant material or anion emitting material may be crushed into powder that is then mixed with an ink for printing.

In the far infrared radiant material-containing mixed ink of the present invention, the far infrared radiant material may be prepared in various mixture ratios. Preferably, 3 weight % to 10 weight % of far infrared radiant material may be mixed relative to the overall weight of the mixed ink.

The far infrared emissivity may be varied depending on the kind of the far infrared radiant material, the amount of the far infrared radiant material mixed, and the wavelength of the far infrared light and, in the case of printing, may differ depending on the thickness of the printed layer. Thus, the content of the far infrared radiant material is a critical factor.

The applicant has found the optimal range from the results of repetitive tests. If the far infrared radiant material is 10 weight % or more, the quality of printing may be influenced and degraded. Over the content, a rise in the content of the far infrared radiant material does not present a significant increase in the radiation of far infrared rays. That is, adding more far infrared radiant material may increase the manufacturing cost without enhancing the effects.

Meanwhile, as the far infrared radiant material gradually reduces in a range from 3 weight % to 10 weight %, the far infrared emissivity draws a gentle downward curve, but below 3 weight %, a relatively sharp downward curve. Thus, it is preferable to maintain the content in the above range to achieve a desired target far infrared emissivity.

Meanwhile, Applicant requested the Korea Far Infrared Association (KFIA) to do a test on printed matter applied with a mixed ink of the present invention. It was verified from the results of the test that the emissivity was 0.88 where the mixed ink of 1% to 25% was applied per unit area of the printed matter, 0.884 where the mixed ink of 30% to 50% was applied, and 0.894 where the mixed ink of 50% to 100% was applied. Thus, it can be shown that a emissivity of 0.88 or more may be maintained by applying the mixed ink to even a small area of the printed matter although it may be varied depending on the type of printing.

It is preferable that the far infrared radiant material has a diameter ranging from 1 µm to 5 µm. Where the particle size of the far infrared radiant material is too small, crushing may not be easy and may take more time, equipment, and costs. In contrast, where the particle size is too large, mixing with pigment may be uneven and affect the quality of printing. Thus, the particle size is very critical. Applicant has found the optimal particle size range that may ensure easier crushing and good printing quality from the results of repetitive tests.

The far infrared radiant material may be mixed with any one or two of an ink binder or ink solvent and be then mixed with the pigment blend. Here, various kinds of ink binders may be used, such as, e.g., a resin, vegetable binder, or ink solvent.

The pigment blend may be prepared by adding one or more of an ink binder or an ink adjuvant to the pigment. Here, various kinds of ink adjuvants may be used, such as, e.g., anti-setoff agents, slip agents, drying agents, anti-drying agents, or ink solvents.

Specifically, where the pigment blend is yellow, the pigment blend may be prepared of the pigment of 10 weight % to 13 weight %, the ink binder of 70 weight % to 75 weight %, and the ink adjuvant of 5 weight % to 10 weight %, and unless yellow, be prepared of the pigment of 18 weight % to 22 weight %, the ink binder of 65 weight % to 70 weight %, and the ink adjuvant of 5 weight % to 10 weight %.

Described below is a method of manufacturing a mixed ink containing a far infrared radiant material according to an embodiment of the present invention.

Referring to FIG. 1, a pigment blend is prepared by blending an ink binder with a pigment (S11) and dispersing the pigment to surround the pigment with the ink binder (S13).

The primary basic particles of the pigment have a small particle size of, e.g., 1 µm or less but, while powdered, may be conglomerated into secondary particles with a larger diameter. The dispersing step (S13) may turn the pigment particles back into the basic particle state while allowing the ink binder to surround the dispersed pigment, thereby leaving the pigment overall in a stable state.

Meanwhile, a far infrared radiant material blend is prepared by crushing a far infrared radiant material to have a preset diameter range (S21), blending the crushed far infrared radiant material with an ink binder (S23), and then dispersing the crushed far infrared radiant material (S25).

The far infrared radiant material may be a raw material with a particle diameter ranging from, e.g., 3 µm to 20 µm, and may be crushed by a pulverizer into a diameter of 5 µm or less.

The step S11 of blending the pigment with the ink binder and the step S23 of blending the far infrared radiant material with the ink binder may further include adding an ink solvent corresponding to the dispersion viscosity of the blends.

Next, the pigment blend may be mixed with the far infrared radiant material blend (S31).

Lastly, adjustment (S33) is performed by mixing any one or two or more of an ink adjuvant or an ink solvent with the mixture of the pigment blend and the far infrared radiant material blend.

The adjustment step S33 is the step of forming a mixed ink of the final state by adding the ink adjuvant or ink solvent to enable stable printing during the printing process and post-printing process.

The far infrared radiant material-containing mixed ink prepared by the above-described method and with the above-described content ratio present the following effects.

First, the far infrared radiant material-containing mixed ink according to the present invention has an far infrared emissivity ranging from 0.87 to 0.93 in a temperature range from 20° C. to 39° C. and as high a deodorization rate as reducing odors by 60% to 80% three hours after printing.

Figure 2:
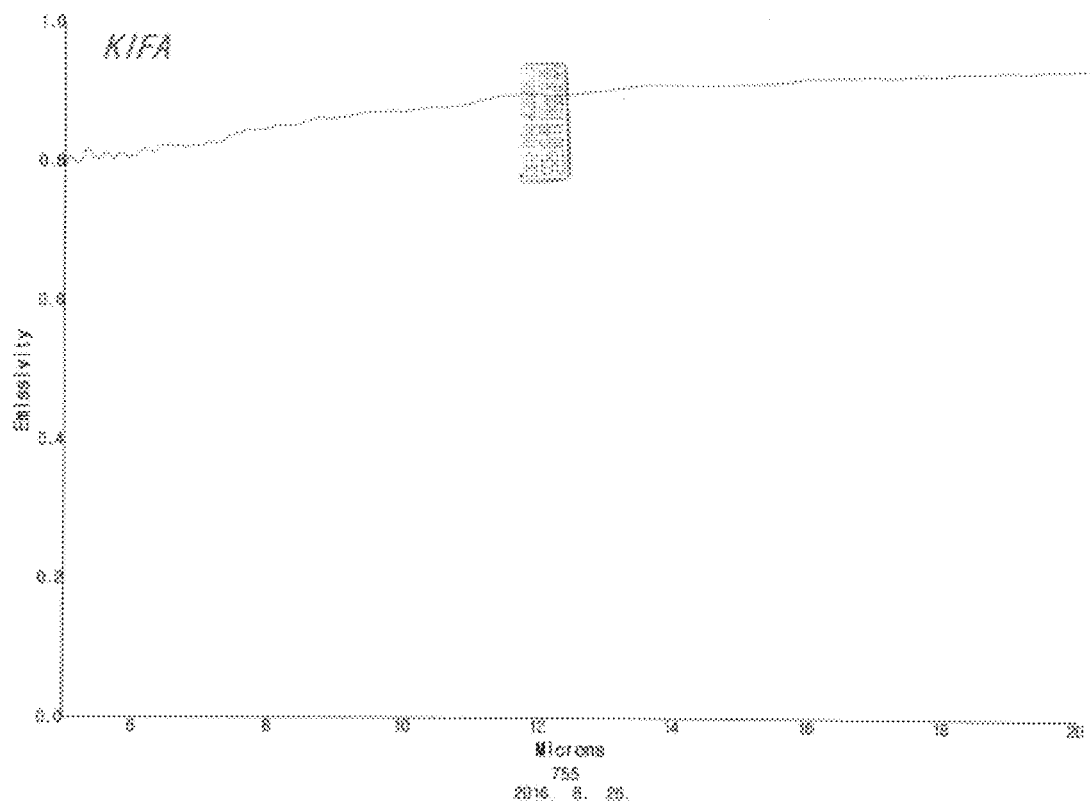
FIG. 2 is a graph illustrating results of a test for a far infrared emissivity of printed matter resulting from using a mixed ink containing a far infrared radiant material according to the present invention.

FIG. 2 is a graph included in the test report of test performed by the KIFA on the emissivity of matter printed with a far infrared radiant material-containing mixed ink according to the present invention.

As a test condition, the emissivity was measured at an ambient temperature of about 37° C. It may be verified from FIG. 2 that the far infrared emissivity ranges from about 0.87 to about 0.93 (5 μm to 20 μm).

Figure 3:
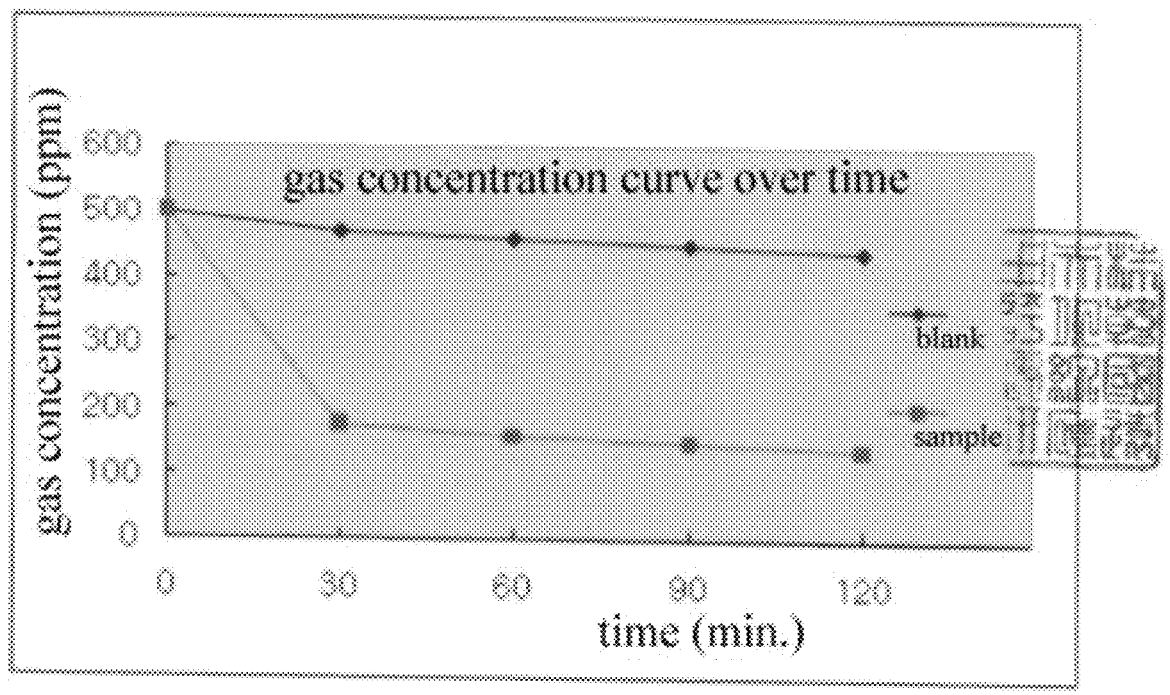
FIG. 3 is a graph illustrating results of a test for variations in deodorization rate of printed matter resulting from a mixed ink containing a far infrared radiant material according to the present invention.

FIG. 3 is a graph illustrating the deodorizability, over time, of printed matter obtained using a far infrared radiant material-containing mixed ink and printed matter (Blank) obtained otherwise (where ammonia was used as a sample gas). It may be verified from FIG. 3 that the deodorizability reaches 60% to 80% about two hours later.

TABLE 1

| time elapse (min.) | Blank concentration | sample concentration | deodorizability (%) |
|---|---|---|---|
| initial stage | 500 | 500 | — |
| 30 | 470 | 175 | 63 |
| 60 | 460 | 160 | 65 |
| 90 | 450 | 150 | 67 |
| 120 | 440 | 140 | 68 |

Referring to Table 1 and FIG. 3, it can be seen that, for the far infrared radiant material-containing mixed ink, the deodorizability sharply increases up to 60% within the first 30 minutes. That is, it can be verified that the far infrared radiant material-containing mixed ink is capable of deodorization within a very short time with high deodorizability.

Meanwhile, the far infrared radiant material-containing mixed ink according to the present invention may contain such an amount of the far infrared radiant material that the concentration of *staphylococcus* is reduced by 90% or more 18 hours later relative to the initial concentration and the concentration of pneumonia-causing germs is reduced by 90% or more 18 hours later relative to the initial concentration.

Figure 4:
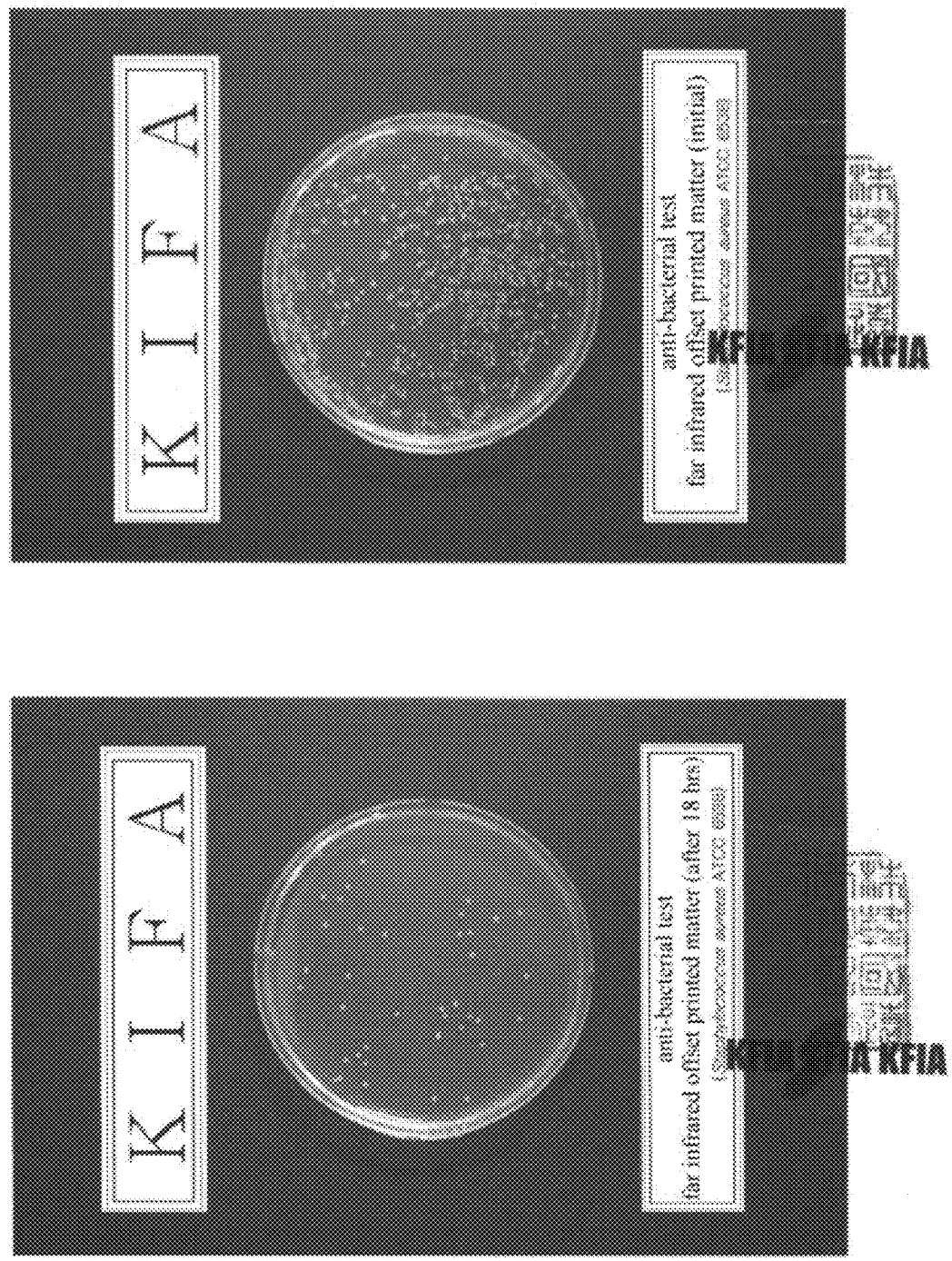
FIG. 4 is a photo illustrating results of an anti-*staphylococcus* test for printed matter resulting from using a mixed ink containing a far infrared radiant material according to the present invention.

FIG. 4 shows photos for an anti-bacterial (*Staphylococcus aureus* ATCC 6538) test on matter printed with a far infrared radiant material-containing mixed ink according to the present invention, which compare the initial stage (right) and 18 hours later (left). The test was carried out by the KIFA.

It may be shown from Table 2 that *staphylococcus* was reduced by about 96.2% 18 hours after.

TABLE 2

| Test items | Samples | initial concentration (CFU/ml) | concentration after 18 hours | bacterial reduction ratio (%) |
|---|---|---|---|---|
| anti-bacterial test on *staphylococcus* | standard test fabric | 3.4 × 10$^4$ | 1.7 × 10$^6$ | — |
| | far infrared offset printed matter | | 6.4 × 10$^4$ | 96.2 |
| anti-bacterial test on pneumonia-causing germs | standard test fabric | 4.2 × 10$^4$ | 2.4 × 10$^6$ | — |
| | far infrared offset printed matter | | 7.0 × 10$^4$ | 97.1 |

Figure 5:
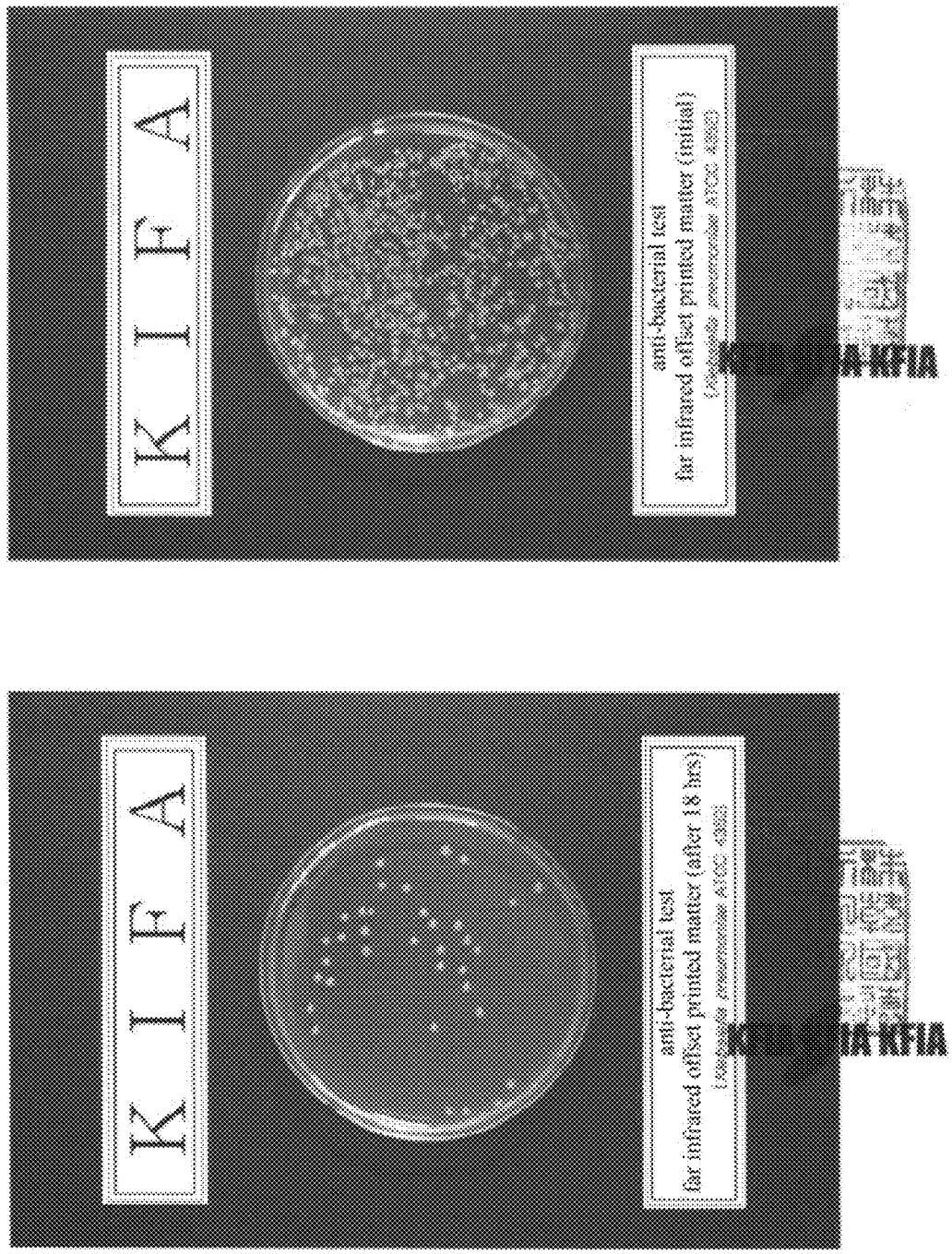
FIG. 5 is a photo illustrating results of an anti-pneumonia-causing germ test for printed matter resulting from using a mixed ink containing a far infrared radiant material according to the present invention.

FIG. 5 shows the results of an anti-bacterial test on pneumonia-causing germs (*Klebsiella pneumoniae* ATCC 4352). It may be shown from FIG. 5 that pneumonia-causing germs were reduced by 97.1% or more 18 hours after (left) the initial stage (right). (refer to Table 2) FIGS. 6 and 7 regard a test on the state of preservation over time of fruit placed in a food packing container printed with a far infrared radiant material-containing mixed ink according to the present invention and fruit placed in a normal food packing container.

Figure 6:
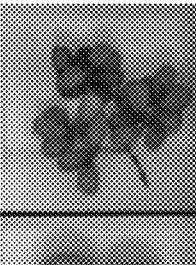
FIGS. 6 and 7 are photos illustrating results of a food reservation test for a packing container containing printed matter or a food packing container printed with a mixed ink containing a far infrared radiant material according to the present invention.
Figure 6:
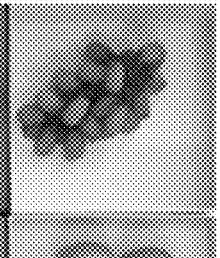
Figure 6:
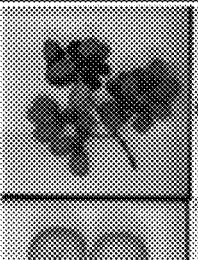
Figure 6:
Figure 6:
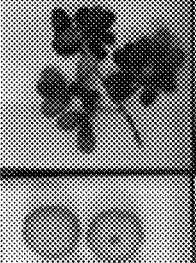
Figure 6:
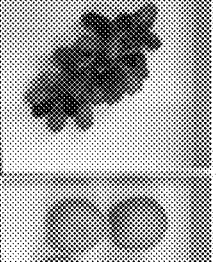

Referring to FIG. 6, the yellow boxes on the left side are those printed with a far infrared radiant material-containing mixed ink, and the normal white packing boxes on the right side have matter printed with a far infrared radiant material-containing mixed ink placed therein.

Figure 7:

It could be verified that in the white boxes which are not printed with the far infrared radiant material-containing mixed ink, the state of preservation started to differ since about two weeks elapsed (Jun. 13, 2017) and that as shown in FIG. 7, the state of preservation prominently differed about one month after (Jun. 29, 2017).

INDUSTRIAL AVAILABILITY

Therefore, matter printed with a far infrared radiant material-containing mixed ink according to the present invention may maintain a high far infrared emissivity of 0.88 or more, thus able to remove harmful gases coming out of the printed matter by 60% or more and preventing the user from feeling reluctant in using the printed matter. Further, the present invention may reduce *staphylococcus* and pneumonia-causing germs by about 90% or more, preventing contamination and transmission of germs due to use of printed matter while maintaining cleanness.

Further, when studying materials or books are printed with a far infrared radiant material-containing mixed ink according to the present invention, far infrared rays are radiated from the printed matter itself, blocking various harmful substances and presenting various advantageous effects of far infrared radiations.

A food stored in a food packing container printed with a far infrared radiant material-containing mixed ink according to the present invention or placed along with the printed matter may remain clean and fresh and be prevented from decomposition. As such, the present invention may prolong the period of preservation and sell-by date, contributing to the growth and viability of relevant industry.

Further, the far infrared radiant material-containing mixed ink according to the present invention may be applicable to IT, car, home appliance, construction, or other various industrial sectors for which ink or paint may be used, in various manners, such as printing, applying, deposition, or adhesion, maximizing expandability and contributing to the development of the relevant industrial sectors.

Further, the far infrared radiant material-containing mixed ink according to the present invention may present high emissivity by being merely used without including the far infrared radiant material in the target object to which the ink is applied, such as paper or wall paper, thereby significantly saving manufacturing costs and maximizing the effects.

The invention claimed is:

1. A mixed ink containing a far infrared radiant material, used for printing and prepared by mixing a pigment blend with a powdered far infrared radiant material, wherein the pigment blend is prepared by adding one or more of an ink binder or an ink adjuvant to a pigment, and, wherein where the pigment blend is yellow, the pigment blend is prepared of the pigment of 10 weight % to 13 weight %, the ink binder of 70 weight % to 75 weight %, and the ink adjuvant of 5 weight % to 10 weight %, and wherein where the pigment blend is not yellow, the pigment blend is prepared of the pigment of 18 weight % to 22 weight %, the ink binder of 65 weight % to 70 weight %, and the ink adjuvant of 5 weight % to 10 weight %.

2. The mixed ink of claim 1, wherein the far infrared radiant material is mixed in 3 weight % to 10 weight % relative to an overall weight of the mixed ink.

3. The mixed ink of claim 1, wherein the far infrared radiant material is prepared to have a diameter range from 1 µm to 5 µm.

4. The mixed ink of claim 1, wherein the far infrared radiant material is blended with any one or two of an ink binder or an ink solvent and is then blended with the pigment blend.

\* \* \* \* \*